Nov. 15, 1932.        H. MacELHONE        1,888,178
METHOD OF PREPARING ICE CREAM SERVINGS
Filed June 28, 1930
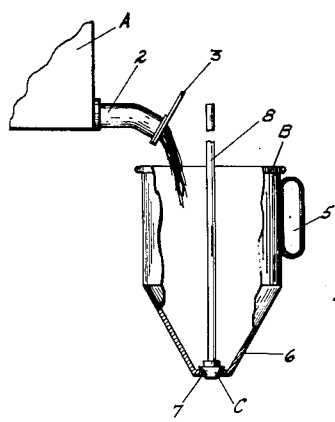
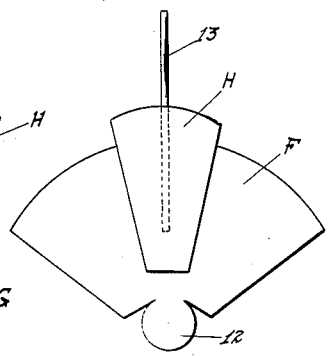
Fig. 1.  Fig. 4.  Fig. 5.  Fig. 6.
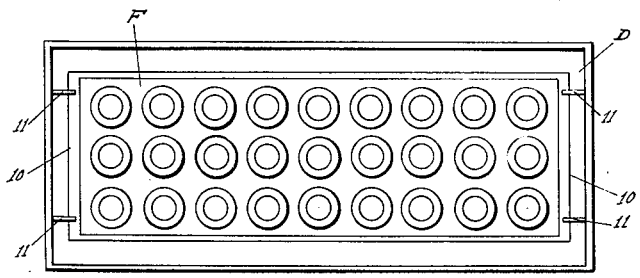
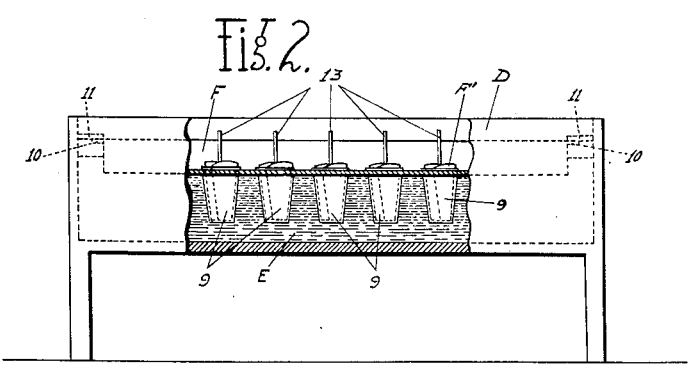
Fig. 3.
INVENTOR.
HARRY MacELHONE.
BY Philip S. Hopkins
ATTORNEY.

Patented Nov. 15, 1932

1,888,178

UNITED STATES PATENT OFFICE

HARRY MacELHONE, OF BINGHAMTON, NEW YORK, ASSIGNOR TO MacELHONE METHODS INC., OF BINGHAMTON, NEW YORK, A CORPORATION OF NEW YORK

METHOD OF PREPARING ICE CREAM SERVINGS

Application filed June 28, 1930. Serial No. 464,683.

The present invention has reference to an improved method of making and handling ice cream for distribution in a more sanitary manner. The words "ice cream" as used throughout this specification and claims are intended to mean all frozen confections such as ices, sherbets, etc.

At present, ice cream is delivered to the retailer in large cans, and dispensed therefrom in small quantities to be served to consumers, by means of a spoon or other instrumentality, which of course is brought into direct contact with the cream. The same spoon or instrumentality is used with various containers of different flavored cream. After each use, the spoon is placed in a receptacle containing water for cleaning, but in which the various flavors or elements of cream are mixed, thereby producing a dirty solution from which the spoon is taken for repeated uses. This obviously is a very unsanitary and objectionable practice.

It is therefore the object of the present invention to provide a new and improved method of making ice cream in individual portions or articles which can be served to the consumer without resorting to the above noted objectionable practice, or the use of any instrumentality in proportioning the cream from a mass for individual consumption.

In carrying out the invention I provide a new and improved method of transferring the ice cream while in a semi-frozen condition from a mixing and freezing container into a suitable receptacle, from which it is dispensed in proper proportions into molds in which the ice cream is to be frozen, said molds being supported in a refrigerating apparatus, thereby producing ice cream in any desired shape or size for individual consumption, so that the cream can be conveniently served without handling the same in the objectionable manner hereinabove outlined.

Another object of the invention resides in the provision of a new and improved method for manufacturing and handling ice cream in articles for individual consumption, wherein each article is provided with a wrapper during the manufacture thereof, and which wrapper also serves as a lining for the mold in which the article is frozen.

A further object of the invention is to reduce by my improved method the steps of handling the ice cream during its preparation for and freezing, thereby reducing the cost of manufacture and expediting the process.

Still another object lies in the step of filling the lined molds while the same are supported in the freezing chamber, thereby insuring instant freezing action on the mixture as soon as it is placed in the mold and in addition eliminating the step of placing the molds, after filling, in the freezing chamber.

Another object lies in the final step of preparing the servings for dispensing, namely, stripping the wrapper from the frozen mixture and placing the serving in a cone for eating, all contributing to economy, speedy and sanitary dispensation of the ice cream.

Other objects and advantages will appear from the following detail description when read in connection with the accompanying drawing, the invention residing in the use together of the several steps set forth in each of the appended claims.

In the drawing forming part of this application like numerals of reference indicate similar parts in the several views and wherein:

Figure 1 is a side elevation of part of the apparatus employed in connection with the invention.

Figure 2 is a plan view of the refrigerating apparatus with the cover removed.

Figure 3 is a side elevation of the refrigerating apparatus partly broken away and showing the manner of supporting the molds therein.

Figure 4 is a view showing the wrapped serving removed from the mold.

Figure 5 is a view showing the serving supported in a cone.

Figure 6 is a view showing the wrapper unfolded from the serving.

In accordance with my improved method of making and handling ice cream in individual articles, the ice cream mixture is first placed in a suitable container A which may vary in size and contour without departing from the inventive idea. The ice cream mixture is partly frozen in the container A, but is drawn therefrom while in a semi-frozen condition through an outlet spout 2 having a valve 3 associated therewith.

In carrying out the invention I employ what I term a dispensing receptacle B provided with a handle 5, and a substantially frusto-conical lower portion 6, so that the ice cream mixture can be dispensed through the opening 7 in the bottom thereof. Arranged within the dispensing receptacle is a normally seated valve C provided with an operating handle 8 which projects above the receptacle so that the valve can be conveniently manipulated.

The ice cream mixture received by the receptacle B from the container A is sub-divided by dispensing into a plurality of molds 9 which may vary in shape or size, so that the frozen article produced can vary in these respects within the scope of the present invention. The molds 9, however, are preferably of the configuration illustrated, so that the articles produced are in a form capable of being placed in a cone-shaped holder G for individual consumption. This article is indicated at H. The molds 9 are filled with the semi-frozen ice cream mixture from the dispensing receptacle B, by intermittently opening the valve C, but before the molds are filled in this manner, each mold is provided with a lining F' preferably formed of antiseptic paper, which is adapted to be removed from the mold with the article to constitute a wrapper for the latter. The lining F' is preferably of segmental contour in its normally unfolded condition, and formed with a circular portion 12 projecting from the reduced end thereof, so that when the lining is placed within the mold and given a contour similar to the latter, the circular portion 12 is bent to occupy a horizontal position, or in other words form a bottom for the wrapper. After this has been accomplished, the ice cream mixture is dispensed from the receptacle B into the molds, and is there subjected to a freezing temperature. Prior to this step in the method, however, a stick 13 may be positioned within the semi-frozen article, so that after the latter has been completely frozen, the article can be conveniently removed from the mold thereby. The article can be then placed in any suitable receptacle or container for individual consumption, such as the edible cone-holder G, prior to which of course the wrapper F' is removed from the article. The stick 13 is also removed under these conditions, but may, if desired, remain in the article to serve as a holder therefor for individual use.

The molds 9 are fixed in openings formed in the bottom of a pan F forming part of the refrigerating apparatus, and which pan is adapted to be arranged within a suitable tank D containing a refrigerant. The pan is provided with end flanges 10 which are removably supported by projections 11 carried by the tank D. As clearly illustrated, the molds 9 depend from the bottom of the pan F into the refrigerant or freezing substance E contained in the tank D, and after the pan has been positioned within the latter and the liners and mixture placed in the molds, the tank is covered by a suitable closure to maintain at a suitably low temperature until the articles contained in the molds are completely frozen or solidified.

It is to be understood that the pan F is removable from the freezing tank for the purpose of cleaning the same, and that all during the process of preparing the ice cream servings, the molds are in fixed position in the pan and the pan in position in the freezing chamber. This keeps the molds extremely cold so that as soon as the mixture is placed therein, the freezing thereof commences.

Briefly, the operation of my invention may be described as follows: The tank and freezing chamber being prepared, the pan F is placed therein, and the molds 9 placed in the pan. The liners F' are then placed in the molds ready to receive the ice cream mixture. The mixture is then drawn off from the receptacle A into the dispensing receptacle B and from this the molds 9 are filled while in the freezing chamber. When the freezing has been completed, the frozen servings with the liners therearound, forming wrappers, are removed from the molds, by lifting them out by the protruding ends of the liners or by the sticks 13 if the latter are used.

In serving the individual portions of frozen ice cream, the wrappers 9 are stripped off and the ice cream placed directly in a cone or other receptacle for eating.

Manifestly I have devised a method of manufacturing ice cream and articles for individual consumption which can be served to the consumer or customer without the objectionable features attending the present day method of dispensing ice cream from large containers in the manner hereinabove set forth.

While it is believed that from the foregoing description the nature and advantages of the invention will be readily apparent, I desire to have it understood, that I do not limit myself to what is herein shown and described and that such changes may be resorted to when desired as fall within the scope of what is claimed.

What is claimed is:

1. The method of preparing ice cream servings comprising the steps of placing a plurality of individual molds into a freezing chamber, placing liners in said molds, mixing and partially freezing the ice cream mixture, dispensing said partially frozen mixture into said lined molds while supported in said freezing chamber, and removing said liners and mixture for serving after complete freezing in said molds.

2. The method of preparing ice cream servings comprising the steps of placing a plurality of individual molds into a freezing chamber, placing liners in said molds, mixing and partially freezing the ice cream mixture, dispensing said partially frozen mixture into said lined molds while supported in said freezing chamber, removing said liners and mixture after complete freezing, stripping said liners from said frozen mixture, and serving such mixture in a suitable holder.

3. The method of preparing ice cream servings comprising the steps of preparing flexible liners each of segmental contour and having a circular portion projecting from its reduced end, placing one of such liners in each of a plurality of molds or frusto-conical shape, partially freezing an ice cream mixture, dispensing the partially frozen mixture into the lined molds, completing the freezing of the mixture in the molds, removing the frozen servings of ice cream from the molds with the liners thereon, stripping the liners from the servings and placing the servings in holders of conical shape conforming to the conical shape given to the servings by the molds.

4. The method of preparing ice cream servings comprising the steps of placing a plurality of individual molds of frusto-conical shape in a freezing chamber, placing in each mold a liner of flexible material of segmental contour and having a circular portion projecting from its reduced end, preparing and partially freezing an ice cream mixture, dispensing the partially frozen mixture into the lined molds while the latter are supported in the freezing chamber, completing the freezing of the servings while in the molds, removing the servings from the molds with the liners thereon, removing the liners from the servings, and placing the servings in holders of conical shape conforming to the conical shape given to the servings by the molds.

5. The method of preparing ice cream servings comprising the steps of placing flexible liners in a plurality of individual cone shaped molds, mixing and partially freezing the ice cream mixture, dispensing said partially frozen mixture into said lined molds, completely freezing said mixture in said molds, removing said liners and mixture from the molds after freezing, removing said liners from said frozen mixture and placing said mixture in substantially cone shaped edible holders for serving.

6. The method of preparing ice cream servings comprising the steps of mixing and partially freezing the ice cream mixture, dispensing said partially frozen mixture into formed individual, substantially cone shaped flexible wrappers, completely freezing said mixture in said wrappers, removing said wrappers from said frozen mixture, and placing said frozen mixture in substantially cone shaped edible holders for serving with the frozen mixture supported solely by the side walls of the edible holder.

7. The method of preparing ice cream servings comprising the steps of dispensing the ice cream mixture into formed individual, substantially cone shaped flexible wrappers, freezing said mixture in said wrappers, removing said wrappers from said frozen mixture, and placing said frozen mixture in substantially cone shaped edible holders for serving with the frozen serving supported solely by the side walls of the edible holder.

8. The method of preparing individual ice cream servings comprising the steps of dispensing the ice cream mixture into formed, individual, substantially cone shaped wrappers, freezing said mixture in said wrappers, removing said wrappers from said frozen mixture and placing said frozen mixture in substantially cone shaped edible holders for serving with the frozen mixture supported solely by the side walls of the edible holder.

9. The method of preparing individual ice cream servings comprising the steps of dispensing the ice cream mixture into formed, flexible, individual wrappers, freezing said mixture in said wrappers, removing said wrappers from said frozen mixture, and placing said frozen mixture into substantially cone-shaped edible holders for serving with the frozen mixture supported solely by the side walls of the edible holder.

In testimony whereof I have affixed my signature.

HARRY MacELHONE.